(12) United States Patent
Zhu (10) Patent No.: US 12,156,247 B2
(45) Date of Patent: Nov. 26, 2024

(54) METHOD AND APPARATUS FOR DETECTING UNLICENSED FREQUENCY BAND

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 394 days.

(21) Appl. No.: 17/622,752

(22) PCT Filed: Jun. 28, 2019

(86) PCT No.: PCT/CN2019/093801
§ 371 (c)(1),
(2) Date: Dec. 24, 2021

(87) PCT Pub. No.: WO2020/258273
PCT Pub. Date: Dec. 30, 2020

(65) Prior Publication Data
US 2022/0167394 A1 May 26, 2022

(51) Int. Cl.
H04W 74/00 (2009.01)
H04W 16/14 (2009.01)
H04W 74/0808 (2024.01)

(52) U.S. Cl.
CPC ......... *H04W 74/006* (2013.01); *H04W 16/14* (2013.01); *H04W 74/0808* (2013.01)

(58) Field of Classification Search
CPC .............................. H04W 74/006; H04W 16/14
See application file for complete search history.

(56) References Cited

U.S. PATENT DOCUMENTS

| | | | |
|---|---|---|---|
| 2018/0027582 A1* | 1/2018 | Yerramalli | H04L 5/0055 370/336 |
| 2019/0014596 A1 | 1/2019 | Yang et al. | |
| 2020/0037354 A1* | 1/2020 | Li | H04W 74/0808 |
| 2020/0127796 A1* | 4/2020 | Li | H04L 1/1812 |
| 2022/0141805 A1* | 5/2022 | Tooher | H04L 5/0091 370/336 |
| 2022/0416953 A1* | 12/2022 | Li | H04L 1/1896 |

FOREIGN PATENT DOCUMENTS

| | | |
|---|---|---|
| CN | 105101446 A | 11/2015 |
| EP | 3443800 A2 | 2/2019 |
| WO | WO 2016161708 A1 | 10/2016 |

OTHER PUBLICATIONS

European Patent Application No. 19934421.9, extended Search and Opinion dated Jun. 8, 2022, 10 pages.
Indian Patent Application No. 202247003656, Office Action dated Jul. 21, 2022, 6 pages.
PCT/CN2019/093801 International Search Report dated Mar. 26, 2020, 2 pages.

* cited by examiner

*Primary Examiner* — Zhiren Qin
(74) *Attorney, Agent, or Firm* — Cozen O'Connor (57) ABSTRACT

A method and apparatus for detecting an unlicensed frequency band. The method includes: determining whether a detection mechanism for a channel in an unlicensed frequency band needs to be adjusted based on a preset communication parameter; in response to that the detection mechanism needs to be adjusted, determining an adjusted detection mechanism; and detecting the channel in the unlicensed frequency band based on the adjusted detection mechanism.

22 Claims, 6 Drawing Sheets

METHOD AND APPARATUS FOR DETECTING UNLICENSED FREQUENCY BAND

CROSS-REFERENCE TO RELATED APPLICATION

This application is a US national phase application of International Application No. PCT/CN2019/093801, filed on Jun. 28, 2019, the entire content of which is incorporated herein by reference for all purposes.

TECHNICAL FIELD

The disclosure relates to a field of communications technologies, and particularly to a method and an apparatus for detecting an unlicensed frequency band, an electronic device and a computer readable storage medium.

BACKGROUND

With the development of communication scenarios between terminals and base stations, communication between terminals and base stations is not limited to licensed frequency bands, and may also include unlicensed frequency bands.

However, since an unlicensed frequency band is not only occupied by communication between terminals and base stations, but also may be occupied by communication between other devices, when the unlicensed frequency band needs to be occupied during communication between the terminal and the base station, a listen before talk (LBT) detection mechanism may be adopted to detect whether a channel is idle, and more specifically, to detect whether the channel in the unlicensed frequency band is idle. Only when the channel in the unlicensed frequency band is idle can the unlicensed frequency band be occupied for communication.

In related art, a detection mechanism used by the terminal to detect the channel in the unlicensed frequency band is mainly determined based on configuration information of the base station. However, the detection mechanism configured by the base station for the terminal is relatively fixed, which makes it difficult to ensure that the channel in the unlicensed frequency band can be occupied as soon as possible.

SUMMARY

According to a first aspect of embodiments of the disclosure, a method for detecting an unlicensed frequency band is provided. The method is applied to a terminal, and includes: determining whether a detection mechanism for a channel in an unlicensed frequency band needs to be adjusted based on a preset communication parameter; when a detection mechanism needs to be adjusted, determining an adjusted detection mechanism; and detecting the channel in the unlicensed frequency band based on the adjusted detection mechanism.

According to a second aspect of the embodiments of the disclosure, an electronic device is provided. The electronic device includes: a processor; and a memory configured to store instructions executable by the processor; wherein the processor is configured to implement the method for detecting an unlicensed frequency band as described in any above embodiment.

According to a third aspect of the embodiments of the disclosure, a non-transitory computer readable storage medium stored with a computer program thereon is provided. The computer program, when executed by a processor, causes the method for detecting an unlicensed frequency band as described in any above embodiment to be implemented.

BRIEF DESCRIPTION OF THE DRAWINGS

In order to explain the technical solutions in embodiments of the disclosure more clearly, the drawings used in descriptions of the embodiments are briefly introduced below. The drawings described below are only some embodiments of the disclosure.

DETAILED DESCRIPTION

The technical solutions in embodiments of the disclosure are described below with reference to the accompanying drawings in embodiments of the disclosure, and the described embodiments are only a part of the embodiments of the disclosure, rather than all of the embodiments.

Figure 1:
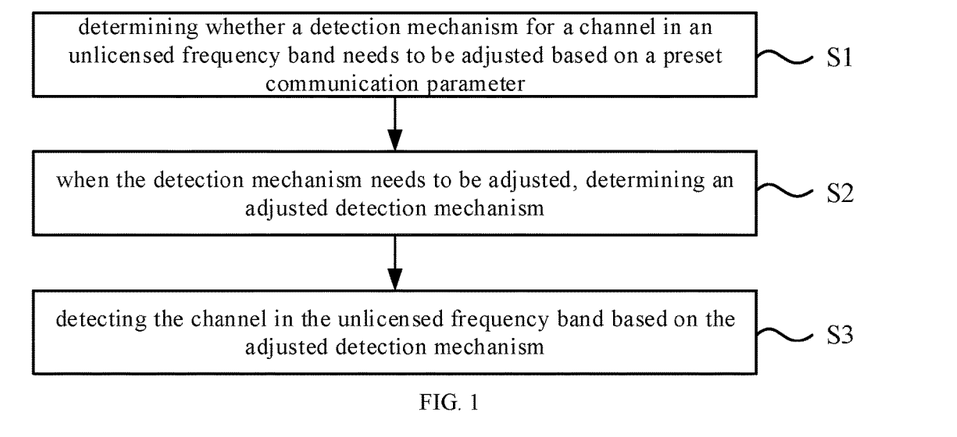
FIG. 1 is a flowchart illustrating a method for detecting an unlicensed frequency band according to an embodiment of the disclosure.

FIG. 1 is a flowchart illustrating a method for detecting an unlicensed frequency band according to an embodiment of the disclosure. The method for detecting an unlicensed frequency band in the embodiments may be applied to a terminal. The terminal includes but is not limited to a mobile phone, a tablet and a wearable device. The terminal can communicate with a base station as a user device and can communicate with a base station through a licensed frequency band (such as a frequency band of an operator network) or through an unlicensed frequency band (such as a frequency band of a Wi-Fi network).

As illustrated in FIG. 1, the method for detecting an unlicensed frequency band may include the following steps.

At step S1, it is determined whether a detection mechanism for a channel in an unlicensed frequency band needs to be adjusted based on a preset communication parameter.

At step S2, when the detection mechanism needs to be adjusted, an adjusted detection mechanism is determined.

At step S3, the channel in the unlicensed frequency band is detected based on the adjusted detection mechanism.

In related arts, the detection mechanism for detecting the channel in the unlicensed frequency band includes but is not limited to cat1 (no LBT), cat2 (no random backoff LBT), cat3 (random backoff LBT with a fixed-length contention window) and cat4 (random backoff LBT with a non-fixed-length contention window). The embodiments of the disclosure are illustrated mainly by taking cat2 and cat4 as examples.

Figure 2:
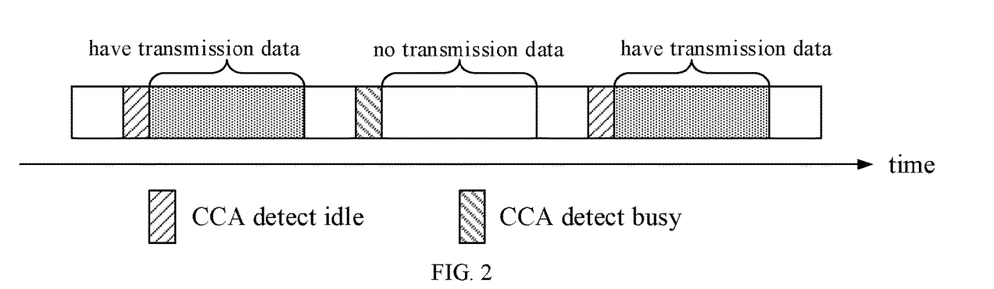
FIG. 2 is a diagram of a cat2 detection mechanism.

FIG. 2 is a diagram of a cat2 detection mechanism.

As illustrated in FIG. 2, based on the cat2 detection mechanism, a sender for sending data in the communication process between a terminal and a base station can detect whether the channel in the unlicensed frequency band is occupied in a time period corresponding to a clear channel assessment (CCA). For example, each CCA corresponds to one slot. The interval between CCAs and the channel occupancy time of each CCA are fixed.

In FIG. 2, when the detection results for the channel in the unlicensed frequency band in the first CCA and the third CCA are idle, indicating that the channel in the unlicensed frequency band is not occupied by other devices, then the channel in the unlicensed frequency band can be occupied after the two CCAs to transmit data, and when the detection result for the channel in the unlicensed frequency band at the second CCA is busy, indicating that the channel in the unlicensed frequency band is occupied by other devices, then the channel in the unlicensed frequency band is not occupied after this CCA to transmit data.

Figure 3:
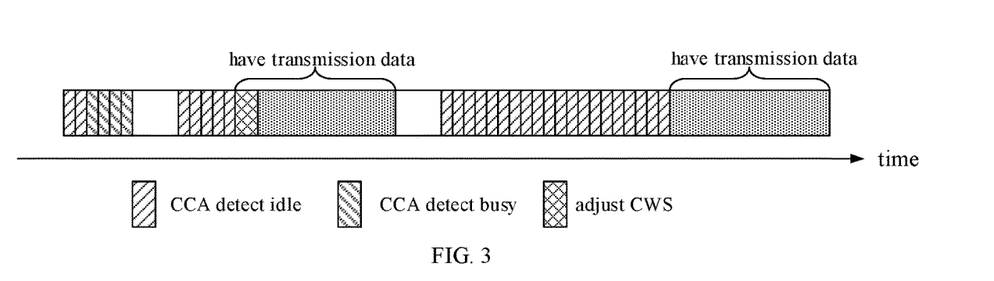
FIG. 3 is a diagram of a cat4 detection mechanism.

FIG. 3 is a diagram of a cat4 detection mechanism.

As illustrated in FIG. 3, based on the cat4 detection mechanism, a count value N of a backoff counter may be uniformly and randomly generated between 0 and a contention window length (CWS), N being between 0 and CWS.

When the the channel in the unlicensed frequency band is detected to be idle in a CCA, the count value of the counter is reduced by 1, and when the channel in the unlicensed frequency band is detected to be busy in a CCA, the count value of the counter keeps unchanged, and when the count value of the counter is 0, the channel in the unlicensed frequency band is occupied immediately.

The CWS is a dynamic value, and may be dynamically adjusted based on whether data sent on a certain preset reference resource is successfully received by a receiver, so that a suitable CWS value may be obtained based on the channel state and the network service load, thereby achieving a compromise between reducing collision between the senders and improving channel access efficiency.

For example, in FIG. 3, when the sender sends data to the receiver for the first time, the CWS used for detecting the channel is 15, and the count value of the counter is 7, then after the channel in the unlicensed frequency band is detected to be idle in 2 CCAs, and the channel in the unlicensed frequency band is detected to be busy in 4 CCAS, and then the channel in the unlicensed frequency band is detected to be idle in 5 CCAs, therefore, channel in the unlicensed frequency band is detected to be idle in 7 CCAs in total, and the count value of the counter is reduced to 0, and the channel in the unlicensed frequency band is occupied to send data to the receiver.

However, when the receiver fails to receive data, the sender can adjust the CWS during occupying the channel in the unlicensed frequency band, for example, the CWS is increased to 31, and the count value of the counter is 20. When the sender sends data to the receiver for the second time, after the channel in the unlicensed frequency band is detected to be idle in 20 CCAs, the channel in the unlicensed frequency band is occupied to send data to the receiver.

Figure 4:
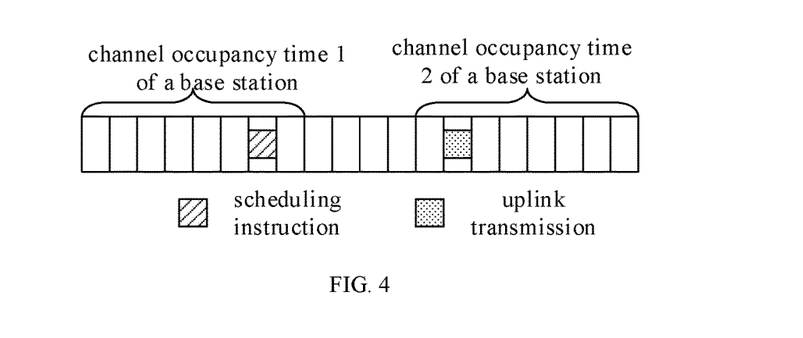
FIG. 4 is a diagram of a detection mechanism configured by a base station for a terminal in the related art.

FIG. 4 is a diagram of a detection mechanism configured by a base station for a terminal in the related art.

In related arts, for the terminal, adopting what kind of detection mechanism is mainly determined based on configuration information of the base station. However, the detection mechanism configured by the base station for the terminal is relatively fixed, and cannot accurately determine the communication condition of the terminal.

For example, as illustrated in FIG. 4, the base station sends a scheduling instruction to the terminal in the channel occupancy time 1, and the terminal is scheduled by the scheduling instruction to perform uplink transmission on a certain time domain resource outside the channel occupancy time 1. However, the base station does not know whether the time domain resource for uplink transmission of the terminal is within its channel occupancy time. For example, after the channel occupancy time 1, the base station further occupies the channel in the unlicensed frequency band in the channel occupancy time 2, but the base station does not know whether the time domain resource for uplink transmission of the terminal is within the channel occupancy time 2 when sending the scheduling instruction to the terminal in the channel occupancy time 1. In this case, based on the current protocol, the base station can only indicate that the terminal detects the channel in the unlicensed frequency band with the detection mechanism with a lower priority (for example, cat4, since the channel in the unlicensed frequency band can be occupied when detected idle by multiple CCAs, which requires longer detection time).

However, as illustrated in FIG. 4, the time domain resource for uplink transmission of the terminal is actually in the channel occupation time 2, then based on the current protocol, the base station may indicate that the terminal detects the channel in the unlicensed frequency band with a detection mechanism with a higher priority (for example, cat2, since the channel in the unlicensed frequency band can be occupied when the channel is detected to be idle in one CCA, which requires shorter detection time). However, the base station has indicated that the terminal detects the channel in the unlicensed frequency band with the detection mechanism with the lower priority, so that the terminal cannot occupy the channel in the unlicensed frequency band as soon as possible.

In an embodiment, it is determined whether the detection mechanism for the channel in the unlicensed frequency band needs to be adjusted based on the preset communication parameter. The preset communication parameter may be the preset communication parameter for communication with the base station, and the preset communication parameter may be preconfigured by the base station, or may be predefined by a protocol.

The preset communication parameter includes but is not limited to: a time interval between time information of a scheduling instruction sent by the base station and a time domain resource scheduled by the scheduling instruction; a time domain resource of uplink transmission scheduled by the scheduling instruction sent by the base station; and a preset pilot sequence. Specific examples of the preset communication parameter are described in subsequent embodiments.

In embodiments of the disclosure, it can be determined whether the detection mechanism for the channel in the unlicensed frequency band needs to be adjusted based on the preset communication parameter, and when the detection mechanism needs to be adjusted, the adjusted detection mechanism can be determined, and further the channel in the unlicensed frequency band is detected based on the adjusted detection mechanism.

It needs to be noted that, adjusting the detection mechanism described in embodiments includes but is not limited to changing the previously determined detection mechanism. When the terminal has not determined a detection mechanism, adjusting a detection mechanism in embodiments may refer to indicating a detection mechanism to the terminal.

Based on this, in case that the detection mechanism for the channel in the unlicensed frequency band is not limited to being configured by the base station based on configuration information in the related art, the terminal can autonomously determine whether the detection mechanism for the channel in the unlicensed frequency band needs to be adjusted based on the preset communication parameter. Since the preset communication parameter can be determined by the terminal, compared with the base station unable to accurately determine the communication condition of the terminal, the terminal can determine its own communication condition to a certain extent based on the preset communication parameter, so as to determine whether to adjust the detection mechanism, so that the adjusted detection mechanism is more suitable for its own communication condition, and can increase the speed of occupying the unlicensed frequency band to a certain extent, ensuring that the communication process of the terminal is completed in time.

Figure 5:
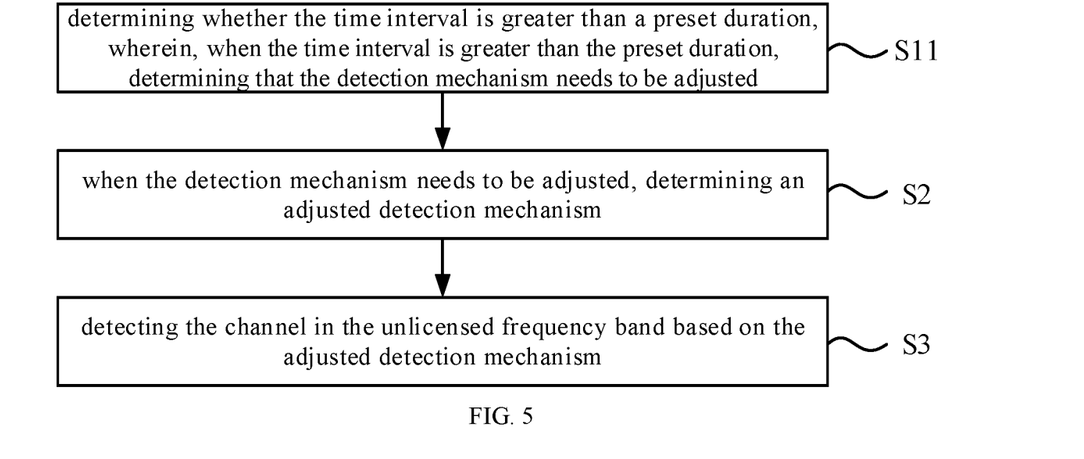
FIG. 5 is a flowchart illustrating another method for detecting an unlicensed frequency band according to an embodiment of the disclosure.

FIG. 5 is a flowchart illustrating another method for detecting an unlicensed frequency band according to an embodiment of the disclosure. As illustrated in FIG. 5, the preset communication parameter includes the time interval between time information of the scheduling instruction sent by the base station and the time domain resource scheduled by the scheduling instruction; determining whether the detection mechanism for the channel in the unlicensed frequency band needs to be adjusted based on the preset communication parameter, includes:

at step S11, determining whether the time interval is greater than a preset duration.

When the time interval is greater than the preset duration, it is determined that the detection mechanism needs to be adjusted.

In an embodiment, the preset communication parameter includes the time interval between time information of the scheduling instruction sent by the base station and the time domain resource scheduled by the scheduling instruction.

Because the time when the base station sends the scheduling instruction to the terminal is in the channel occupancy time of the unlicensed frequency band, the base station can send information such as data and signalings to the base station in the channel occupancy time. When the time interval is greater than the preset duration, the time domain resource scheduled by the scheduling instruction is far from the channel occupancy time of the base station in the unlicensed frequency band. Thus, there is a greater probability that the channel state of the unlicensed frequency band near the time domain frequency has changed relative to the channel state of the base station in the unlicensed frequency band in the channel occupancy time of the unlicensed frequency band, and thus there is a greater probability that the original detection mechanism cannot be accurately applied to the channel state of the unlicensed frequency band under the time domain frequency, in this case, the detection mechanism may be adjusted, for example, the detection mechanism is adjusted from cat4 to cat2.

Correspondingly, when the time interval is smaller than the preset duration, there is a greater probability that the channel state of the unlicensed frequency band near the time domain frequency has not changed relative to the channel state of the base station in the unlicensed frequency band in the channel occupancy time of the unlicensed frequency band, and there is a greater probability that the original detection mechanism may be accurately applied to the channel state of the unlicensed frequency band under the time domain resource, so that the original detection mechanism may be maintained.

Figure 6:
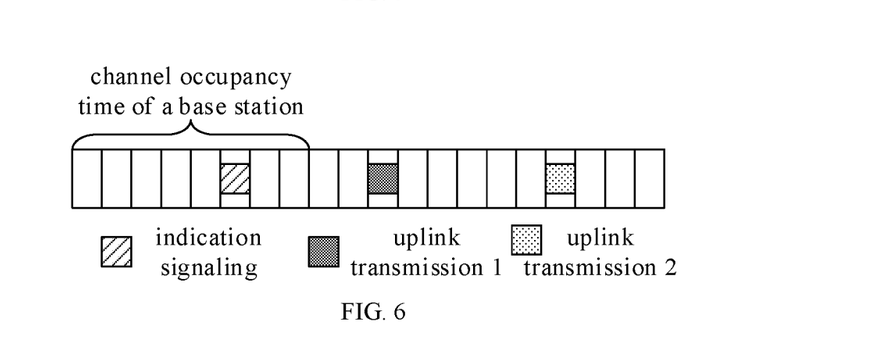
FIG. 6 is a diagram illustrating determining whether a detection mechanism needs to be adjusted according to an embodiment of the disclosure.

FIG. 6 is a diagram illustrating determining whether a detection mechanism needs to be adjusted according to an embodiment of the disclosure.

As illustrated in FIG. 6, when the preconfigured time domain resources corresponding to uplink transmission 1 and uplink transmission 2 occupy the channel in the unlicensed frequency band, the cat4 detection mechanism is adopted to detect the channel in the unlicensed frequency band, wherein the preset duration is 5 slots.

Since the time interval between the time domain resource of the uplink transmission 1 scheduled by the scheduling instruction and time information of the scheduling instruction is 4 slots, and the time interval between the time domain resource of the uplink transmission 2 scheduled by the scheduling instruction and the time information of the scheduling instruction is 9 slots, 4 slots being less than 5 slots, and 9 slots being greater than 5 slots, then when the time domain resource corresponding to the uplink transmission 1 needs to occupy the channel in the unlicensed frequency band, the detection mechanism does not need to be adjusted, that is, the cat4 detection mechanism is maintained to detect the channel in the unlicensed frequency band, and when the time domain resource corresponding to the uplink transmission 2 needs to occupy the channel in the unlicensed frequency band, the detection mechanism needs to be adjusted, for example, the cat2 detection mechanism may be adopted to detect the channel in the unlicensed frequency band.

Figure 7:
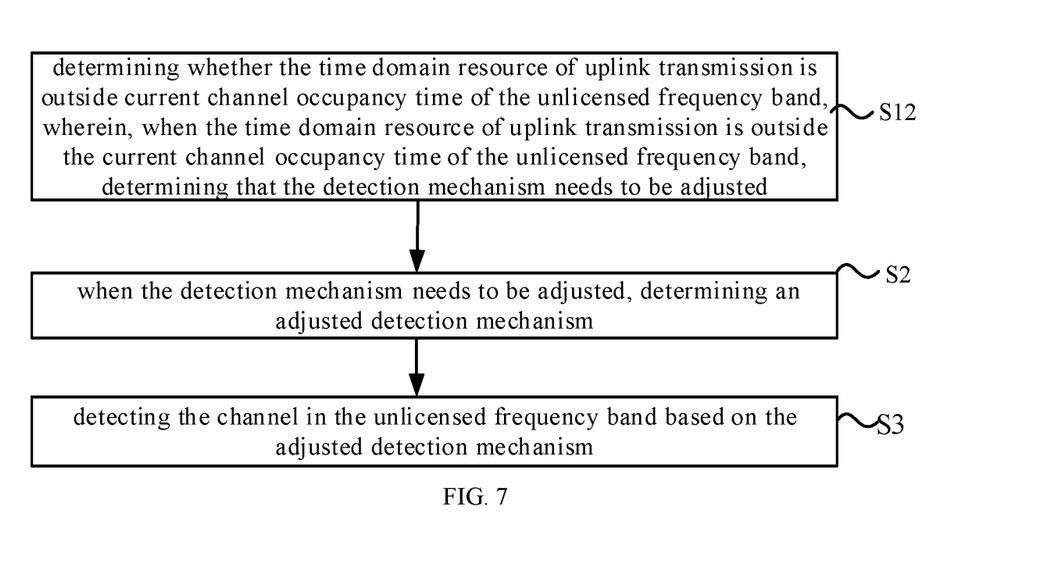
FIG. 7 is a flowchart illustrating yet another method for detecting an unlicensed frequency band according to an embodiment of the disclosure.

FIG. 7 is a flowchart illustrating yet another method for detecting an unlicensed frequency band according to an embodiment of the disclosure. As illustrated in FIG. 7, the preset communication parameter includes a time domain resource of uplink transmission scheduled by the scheduling instruction sent by the base station, determining whether the detection mechanism for the channel in the unlicensed frequency band needs to be adjusted based on the preset communication parameter, includes:

at step S12, determining whether the time domain resource of uplink transmission is outside current channel occupancy time of the unlicensed frequency band.

When the time domain resource of uplink transmission is outside the current channel occupancy time of the unlicensed frequency band, it is determined that a detection mechanism needs to be adjusted.

The current channel occupancy time of the unlicensed frequency band refers to the channel occupancy time of the latest communication between the base station and the terminal in the unlicensed frequency band, which may be channel occupancy time that the base station occupies the channel in the unlicensed frequency band, or channel occupancy time that the terminal occupies the channel in the unlicensed frequency band.

In an embodiment, the preset communication parameter includes a time domain resource of uplink transmission scheduled by the scheduling instruction sent by the base station.

When the time domain resource of uplink transmission is outside the current channel occupancy time of the unlicensed frequency band, there is a greater probability that the time domain frequency corresponding to uplink transmission of the terminal is far from the time of the latest communication between the base station and the terminal, and in this case, the channel state of the unlicensed frequency band near the time domain resource has changed relative to the channel state of the unlicensed frequency band in the communication time between the base station and the terminal, therefore, there is a greater probability that the original detection mechanism cannot be accurately applied to the channel state of the unlicensed frequency band under the time domain frequency, and the detection mechanism may be adjusted, for example, the detection mechanism is adjusted from cat4 to cat2.

Correspondingly, when the time domain resource of uplink transmission is in the current channel occupancy time of the unlicensed frequency band, there is a greater probability that the channel state of the unlicensed frequency band near the time domain frequency has not changed relative to the channel state of the unlicensed frequency band in the communication time between the base station and the terminal, and there is a greater probability that the original detection mechanism may be accurately applied to the channel state of the unlicensed frequency band under the time domain resource, so that the original detection mechanism may be maintained.

Figure 8:
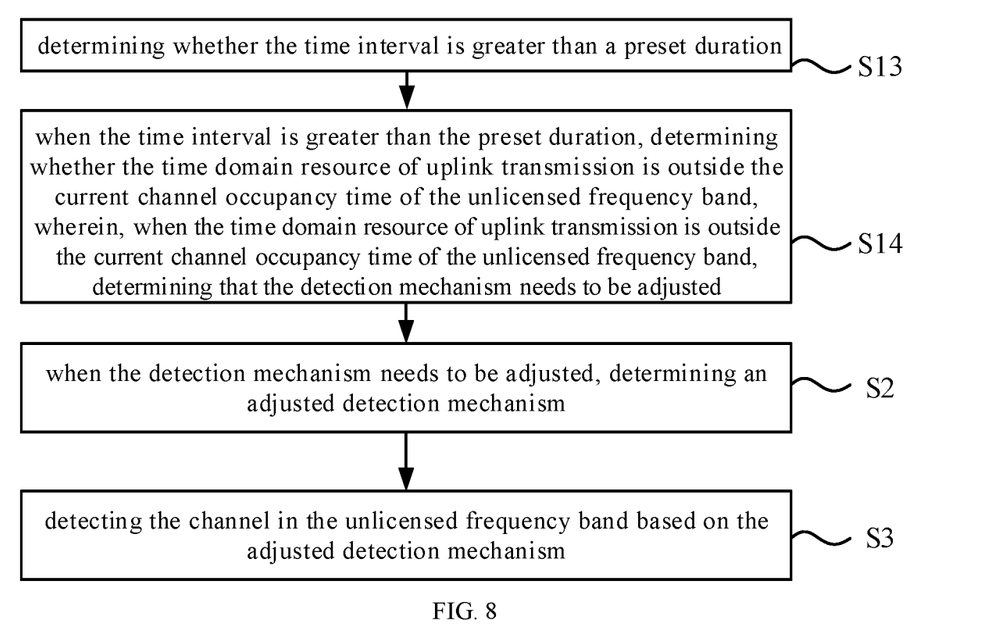
FIG. 8 is a flowchart illustrating still yet another method for detecting an unlicensed frequency band according to an embodiment of the disclosure.

FIG. 8 is a flowchart illustrating another method for detecting an unlicensed frequency band according to an embodiment of the disclosure. As illustrated in FIG. 8, the preset communication parameter includes the time interval between time information of the scheduling instruction sent by the base station and the time domain resource of uplink transmission scheduled by the scheduling instruction, and the time domain resource of uplink transmission scheduled by the scheduling instruction sent by the base station; determining whether the detection mechanism for the channel in the unlicensed frequency band needs to be adjusted based on the preset communication parameter, includes:

at step S13, determining whether the time interval is greater than the preset duration;
at step S14, when the time interval is greater than the preset duration, determining whether the time domain resource of uplink transmission is outside the current channel occupancy time of the unlicensed frequency band.

When the time domain resource of uplink transmission is outside the current channel occupancy time of the unlicensed frequency band, it is determined that the detection mechanism needs to be adjusted.

In an embodiment, the embodiments illustrated in FIG. 5 and FIG. 7 may be combined to first determine whether the time interval is greater than the preset duration, and when the time interval is greater than the preset duration, further determine whether the time domain resource of the uplink transmission is outside the current channel occupancy time of the unlicensed frequency band, so that when the time domain resource of the uplink transmission is outside the current channel occupancy time of the unlicensed frequency band, it is determined that the detection mechanism needs to be adjusted.

When the time interval is less than or equal to the preset duration, or when the time domain resource of uplink transmission is in the current channel occupancy time of the unlicensed frequency band, it is determined that the detection mechanism does not need to be adjusted.

Accordingly, whether the detection mechanism needs to be adjusted may be determined based on a plurality of conditions. Since the plurality of conditions may reflect the communication condition of the terminal from more aspects, the terminal can determine whether the detection mechanism needs to be adjusted more accurately.

Figure 9:
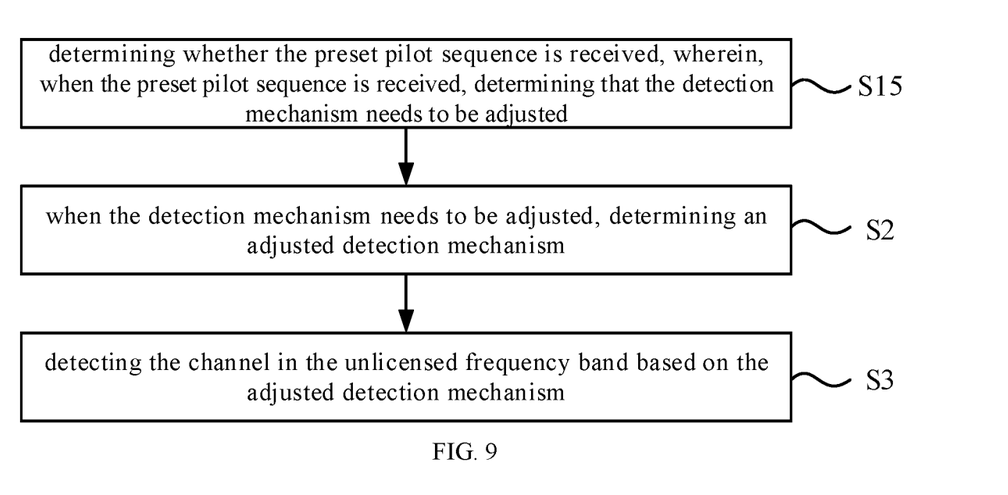
FIG. 9 is a flowchart illustrating yet still another method for detecting an unlicensed frequency band according to an embodiment of the disclosure.

FIG. 9 is a flowchart illustrating yet another method for detecting an unlicensed frequency band according to an embodiment of the disclosure. As illustrated in FIG. 9, the preset communication parameter includes a preset pilot sequence sent by the base station, determining whether the detection mechanism for the channel in the unlicensed frequency band needs to be adjusted based on the preset communication parameter, includes:

at step S15, determining whether the preset pilot sequence is received.

When the preset pilot sequence is received, it is determined that the detection mechanism needs to be adjusted.

In an embodiment, the preset pilot sequence may be configured to detect the channel and correct a frequency offset, and the preset pilot sequence may be an existing pilot sequence in the related art, and also may be a new pilot sequence different from the existing pilot sequence in the related art.

Figure 10:
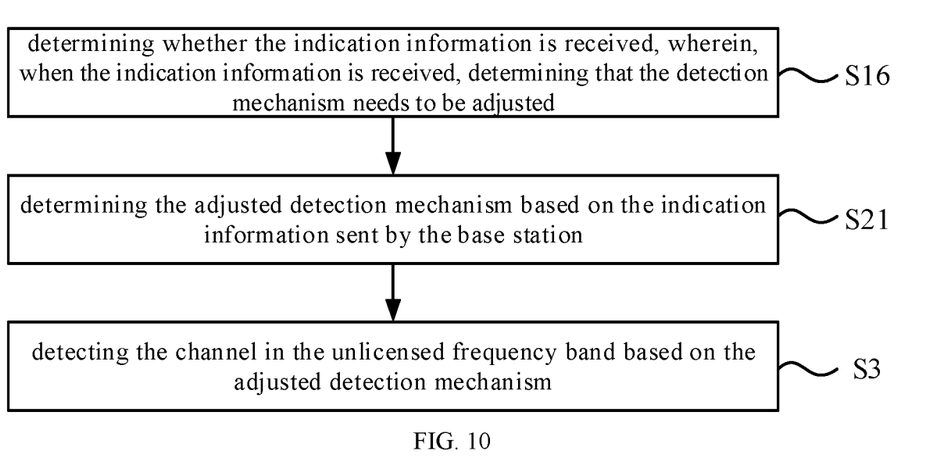
FIG. 10 is a flowchart illustrating still yet another method for detecting an unlicensed frequency band according to an embodiment of the disclosure.

FIG. 10 is a flowchart illustrating yet another method for detecting an unlicensed frequency band according to an embodiment of the disclosure. As illustrated in FIG. 10, the preset communication parameter includes indication information sent by the base station, determining whether the detection mechanism for the channel in the unlicensed frequency band needs to be adjusted based on the preset communication parameter, includes:

at step S16, determining whether the indication information is received.

When the indication information is received, it is determined that the detection mechanism needs to be adjusted.

Determining the adjusted detection mechanism, includes:
at step S21, determining the adjusted detection mechanism based on the indication information sent by the base station.

In an embodiment, whether the detection mechanism needs to be adjusted may be determined based on whether indication information sent by the base station is received. When the indication information sent by the base station is received, it indicates that the base station needs to adjust the detection mechanism, and further based on the indication information sent by the base station, the adjusted detection mechanism may be determined. The indication information may be included in the downlink control information (DCI).

Optionally, the indication information is included in first downlink control information, and the first downlink control information is further configured to indicate information other than the indication information to the terminal.

In an embodiment, the indication information may be included in the first downlink control information, and the first downlink control information may not be downlink control information dedicated to indicating a detection mechanism, and may indicate other information in addition to indicating the detection mechanism. For example, the indication information may be carried by the DCI configured to indicate power control or the DCI configured to indicate a Hybrid Automatic Repeat reQuest (HARD) sent by the base station to the terminal in the related art.

Optionally, the indication information is included in second downlink control information, and the second downlink control information is dedicated to indicating a detection mechanism to the terminal.

In an embodiment, indication information may be included in the second downlink control information, and the second downlink control information may be downlink control information dedicated to indicating a detection mechanism, and may be new DCI different from the DCI in the related art.

Figure 11:
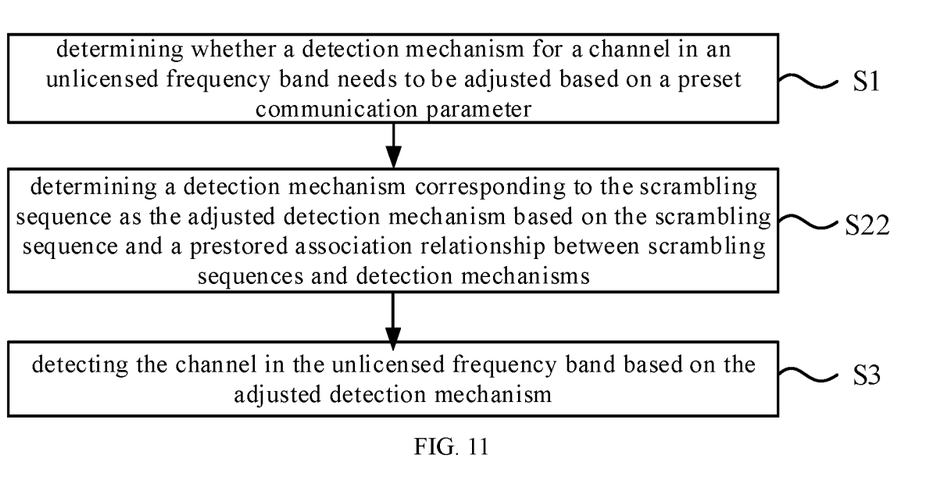
FIG. 11 is a flowchart illustrating still yet another method for detecting an unlicensed frequency band according to an embodiment of the disclosure.

FIG. 11 is a flowchart illustrating yet another method for detecting an unlicensed frequency band according to an embodiment of the disclosure. As illustrated in FIG. 11, the indication information is a scrambling sequence, and determining the adjusted detection mechanism based on the indication information sent by the base station, includes:

at S22, determining a detection mechanism corresponding to the scrambling sequence as the adjusted detection mechanism based on the scrambling sequence and a pre-stored association relationship between scrambling sequences and detection mechanisms.

In an embodiment, the association relationship between the scrambling sequences and detection mechanisms may be pre-stored. The indication information may be a cyclic redundancy check (CRC) scrambling sequence, and after the terminal determines the scrambling sequence, it may determine the detection mechanism corresponding to the scrambling sequence as the adjusted detection mechanism based on the scrambling sequence and the prestored association relationship between scrambling sequences and detection mechanisms.

Optionally, the indication information is configured to indicate updating the determined detection mechanism.

Optionally, the indication information is configured to indicate a detection mechanism.

In an embodiment, the adjusted detection mechanism may be determined based on the indication information sent by the base station. However, the way of indicating a detection mechanism based on indication information may be different. For example, it is possible to indicate the terminal to update the determined detection mechanism. When the terminal does not determine a detection mechanism before receiving the indication information, a detection mechanism is indicated for the terminal, and the terminal performs detection with the indicated detection mechanism.

The terminal does not determine a detection mechanism before receiving the indication information, may refer to that, the base station does not indicate the terminal to adopt what kind of detection mechanism before receiving the indication information, and also may be that even though the terminal receives an indication signaling from the base station before receiving the indication information, the indication signaling indicates to the terminal that adopting what kind of detection mechanism will be notified subsequently.

Figure 12:
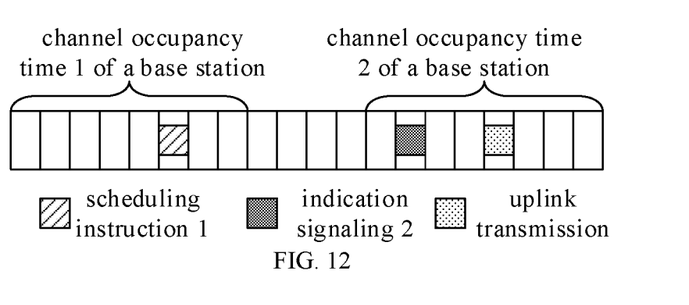
FIG. 12 is a diagram illustrating an adjusted detection mechanism determined based on indication information sent by a base station according to an embodiment of the disclosure.

FIG. 12 is a diagram illustrating an adjusted detection mechanism determined based on indication information sent by the base station according to an embodiment of the disclosure.

As illustrated in FIG. 12, the base station may initiate a scheduling instruction 1 to the terminal at the channel occupancy time 1, and the indication information carried by the scheduling instruction 1 indicates the terminal to detect the channel in the unlicensed frequency band based on the cat4 detection mechanism (equivalent to directly indicating the adjusted detection mechanism) when requiring uplink transmission. Then, the base station may initiate an indication signaling 2 (the indication signaling may be configured to schedule the terminal, or may be configured to control the terminal) to the terminal, and the indication information carried in the indication signaling 2 indicates the terminal to adjust the determined detection mechanism (for example, the cat4 detection mechanism) when requiring uplink transmission, for example, adjust to the cat2 detection mechanism, so that the terminal may detect the channel in the unlicensed frequency band based on the cat2 detection mechanism during uplink transmission.

Figure 13:
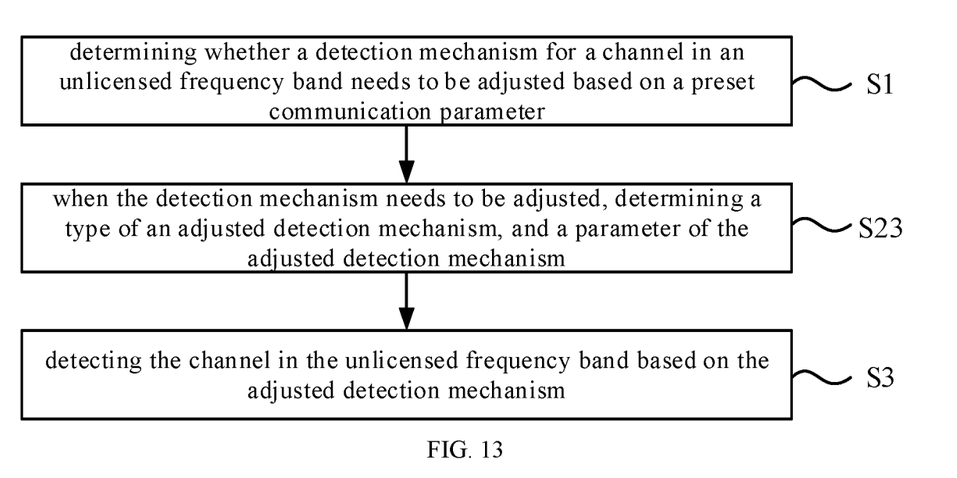
FIG. 13 is a flowchart illustrating still yet another method for detecting an unlicensed frequency band according to an embodiment of the disclosure.

FIG. 13 is a flowchart illustrating another method for detecting an unlicensed frequency band according to an embodiment of the disclosure. As illustrated in FIG. 13, determining the adjusted detection mechanism, includes:

at step S23, determining a type of the adjusted detection mechanism, and a parameter of the adjusted detection mechanism.

In an embodiment, determining the adjusted detection mechanism includes but is not limited to determining the type of the adjusted detection mechanism, it may further includes determining the parameter of the adjusted detection mechanism. For example, based on the indication information in the above embodiment, what kind of parameter is adopted by the detection mechanism may be indicated. Taking the cat4 detection mechanism for an example, the specific value of the CWS may be indicated.

Corresponding to the embodiments of the method for detecting an unlicensed frequency band, the disclosure further provides embodiments of an apparatus for detecting an unlicensed frequency band.

Figure 14:
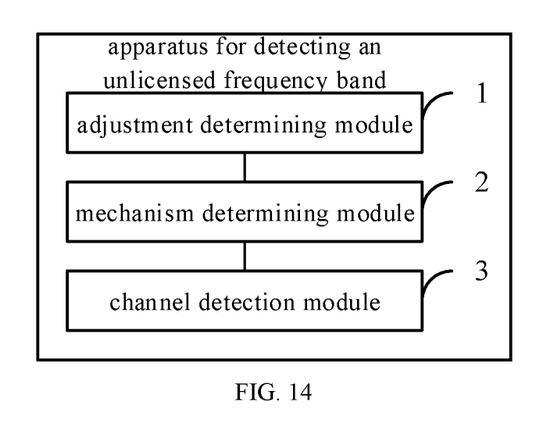
FIG. 14 is a block diagram illustrating an apparatus for detecting an unlicensed frequency band according to an embodiment of the disclosure.

FIG. 14 is a schematic block diagram illustrating an apparatus for detecting an unlicensed frequency band according to an embodiment of the disclosure. The apparatus for detecting an unlicensed frequency band in the embodiments may be applied to a terminal. The terminal includes but is not limited to a mobile phone, a tablet and a wearable device. The terminal may communicate with a base station as a user device and may communicate with the base station through a licensed frequency band (such as a frequency band of an operator network) or through an unlicensed frequency band (such as a Wi-Fi network).

As illustrated in FIG. 14, the apparatus for detecting an unlicensed frequency band may include an adjustment determining module 1, a mechanism determining module 2, and a channel detection module 3.

The adjustment determining module 1 is configured to determine whether a detection mechanism for a channel in an unlicensed frequency band needs to be adjusted based on a preset communication parameter.

The mechanism determining module 2 is configured to, when the detection mechanism needs to be adjusted, determine an adjusted detection mechanism.

The channel detection module 3 is configured to detect the channel in the unlicensed frequency band based on the adjusted detection mechanism.

Optionally, the preset communication parameter includes a time interval between time information of a scheduling instruction sent by the base station and a time domain resource scheduled by the scheduling instruction; the adjustment determining module is configured to determine whether the time interval is greater than a preset duration. When the time interval is greater than the preset duration, it is determined that the detection mechanism needs to be adjusted.

Optionally, the preset communication parameter includes a time domain resource of uplink transmission scheduled by the scheduling instruction sent by the base station; the adjustment determining module is configured to determine whether the time domain resource of uplink transmission is outside the current channel occupancy time of the unlicensed frequency band. When the time domain resource of uplink transmission is outside the current channel occupancy time of the unlicensed frequency band, it is determined that a detection mechanism needs to be adjusted.

Optionally, the preset communication parameter includes a time interval between time information of a scheduling instruction sent by the base station and a time domain resource scheduled by the scheduling instruction, and a time domain resource of uplink transmission scheduled by the scheduling instruction sent by the base station; the adjustment determining module is configured to determine whether the time interval is greater than a preset duration, and when the time interval is greater than a preset duration, determine whether the time domain resource of uplink transmission is outside the current channel occupancy time of the unlicensed frequency band. When the time domain resource of uplink transmission is outside the current channel occupancy time of the unlicensed frequency band, it is determined that a detection mechanism needs to be adjusted.

Optionally, the preset communication parameter includes a preset pilot sequence sent by the base station, the adjustment determining module is configured to determine whether the preset pilot sequence is received. When the preset pilot sequence is received, it is determined that the detection mechanism needs to be adjusted.

Optionally, the preset communication parameter includes indication information sent by the base station, the adjustment determining module is configured to determine whether the indication information is received. When the indication information is received, it is determined that the detection mechanism needs to be adjusted. The mechanism determining module is configured to determine the adjusted detection mechanism based on the indication information sent by the base station.

Optionally, the indication information is included in first downlink control information, and the first downlink control information is further configured to indicate information other than the indication information to the terminal.

Optionally, the indication information is included in second downlink control information, and the second downlink control information is dedicated to indicating a detection mechanism to the terminal.

Optionally, the indication information is a scrambling sequence, and the mechanism determining module is configured to determine a detection mechanism corresponding to the scrambling sequence as the adjusted detection mechanism based on the scrambling sequence and a prestored association relationship between scrambling sequences and detection mechanisms.

Optionally, the indication information is configured to indicate updating the determined detection mechanism.

Optionally, the indication information is configured to indicate a detection mechanism.

Optionally, the mechanism determining module is configured to determine a type of the adjusted detection mechanism, and a parameter of the adjusted detection mechanism.

With regard to the apparatus in the embodiments, the specific way in which each module performs operation has been described in detail in the embodiments of the method and will not be elaborated here.

Since the apparatus embodiments basically correspond to the method embodiments, please refer to part of descriptions of the method embodiments for relevant information. The above apparatus embodiments are merely schematic, the modules described as separate components may or may not be physically separated, and components displayed as modules may or may not be physical modules, that is, may be located in one place, or may be distributed on a plurality of network modules. Some or all of the modules may be selected according to actual requirements to achieve the solutions in the embodiments. Those skilled in the art may understand and implement the method without any creative effort.

An electronic device is provided in embodiments of the disclosure, and includes: a processor; and a memory configured to store instructions executable by the processor. The processor is configured to execute the method for detecting an unlicensed frequency band as described in any above embodiment.

Embodiments of the disclosure further propose a computer readable storage medium stored with a computer program thereon. The computer program implements the method for detecting an unlicensed frequency band as described in any above embodiment when executed by a processor.

Figure 15:
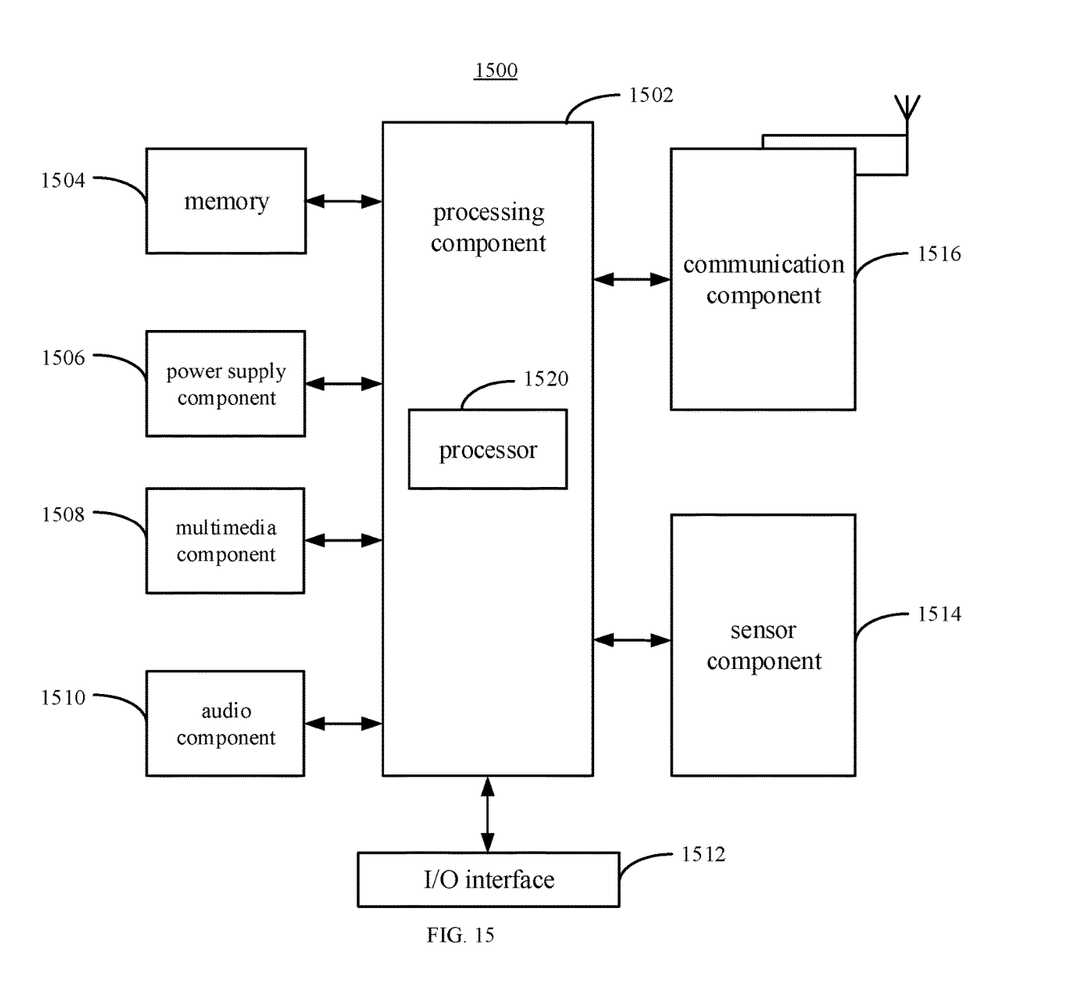
FIG. 15 is a schematic block diagram illustrating an apparatus for detecting an unlicensed frequency band according to an embodiment of the disclosure.

FIG. 15 is a schematic diagram illustrating an apparatus 1500 for detecting an unlicensed frequency band according to an embodiment of the disclosure. For example, the apparatus 1500 may be a mobile phone, a computer, a digital broadcasting terminal, a messaging device, a game console, a tablet device, a medical equipment, a fitness equipment, a personal digital assistant, etc.

As illustrated in FIG. 15, the apparatus 1500 may include one or more components: a processing component 1502, a memory 1504, a power supply component 1506, a multimedia component 1508, an audio component 1510, an input/output (I/O) interface 1512, a sensor component 1514, and a communication component 1516.

The processing component 1502 generally controls the whole operation of the device 1500, such as the operations related to display, phone call, data communication, camera operation and recording operation. The processing component 1502 may include one or more processors 1520 to perform instructions, to complete all or part of blocks of the above method. In addition, the processing component 1502 may include one or more modules for the convenience of interaction between the processing component 1502 and other components. For example, the processing component 1502 may include a multimedia module for the convenience of interaction between the multimedia component 1508 and the processing component 1502.

The memory 1504 is configured to store all types of data to support the operation of the apparatus 1500. Examples of the data include the instructions of any applications or methods operated on the apparatus 1500, contact data, phone book data, messages, pictures, videos, etc. The memory 1504 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1506 may provide power for all components of the apparatus 1500. The power supply component 1506 may include power supply management system, one or more power supplies, and other units related to generating, managing and distributing power for the apparatus 1500.

The multimedia component 1508 includes an output interface screen provided between the device 1500 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touch, slide and gestures on the touch panel. The touch sensor may not only sense the boundary of the touch or slide action, but also detect the duration and pressure related to the touch or slide operation. In some embodiments, the multimedia component 1508 includes a front camera and/or a rear camera. When the apparatus 1500 is in an operation mode, such as a shooting mode or a video mode, the front camera and/or the rear camera may receive external multimedia data. Each front camera and rear camera may be a fixed optical lens system or an optical lens system with a focal length and an optical zoom capacity.

The audio component 1510 is configured to output and/or input a signal. For example, the audio component 1510 includes a microphone (MIC). When the apparatus 1500 is in operation mode, such as call mode, record mode, and speech recognition mode, the microphone is configured to receive the external audio signals. The audio signal received may be further stored in the memory 1504 or sent via the communication component 1516. In some embodiments, the audio component 1510 further includes a speaker configured to output an audio signal.

The I/O interface 1512 provides an interface for the processing component 1502 and the peripheral interface module, and the peripheral interface module may be a keyboard, a click wheel, a button, etc. The button may include but not limited to a home button, a volume button, a start button and a lock button.

The sensor component 1514 includes one or more sensors, configured to provide various aspects of status assessment for the apparatus 1500. For example, the sensor component 1514 may detect the on/off state of the apparatus 1500 and the relative positioning of the component.

For example, the component is a display and a keypad of the apparatus 1500. The sensor component 1514 may further detect the position change of the apparatus 1500 or one component of the apparatus 1500, the presence or absence of contact between the user and the apparatus 1500, the orientation or acceleration/deceleration of the apparatus 1500, and the temperature change of the apparatus 1500. The sensor component 1514 may include a proximity sensor configured to detect the existence of the objects nearby without any physical contact. The sensor component 1514 may further include a light sensor such as CMOS or CCD image sensor, which is configured to use in imaging applications. In some embodiments, the sensor component 1514 may further include an acceleration transducer, a gyroscope sensor, a magnetic sensor, a pressure sensor or a temperature sensor.

The communication component 1516 is configured for the convenience of wire or wireless communication between the apparatus 1500 and other devices. The apparatus 1500 may access wireless networks based on a communication standard, such as WiFi, 2G or 3G, 4G LTE, 5G NR or their combination. In an example embodiment, the communication component 1516 receives a broadcast signal or broadcast-related information from an external broadcast management system via a broadcast channel. In an example embodiment, the communication component 1516 further includes a near field communication (NFC) module to facilitate short-range communication. For example, the NFC module may be achieved based on an RFID technology, an IrDA technology, a UWB technology, a BT technology and other technologies.

In an example embodiment, the apparatus 1500 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components, to perform the method as described in the above any embodiment.

In an example embodiment, a non-transitory computer readable storage medium including instructions is further provided, such as a memory 1504 including instructions, the instructions may be executed by the processor 1520 of the apparatus 1500 to complete the above method. For example, the non-transitory computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

It should be noted that relational terms such as first and second are used herein to distinguish one entity or operation from another without necessarily requiring or implying any such actual relationship or sequence between the entities or operations.

The method and the apparatus provided in the embodiments of the disclosure are described above. The principle and implementation of specific examples of the disclosure are elaborated herein. The description of the above embodiments is merely configured to help understand the method and the core idea of the disclosure. At the same time, for those skilled in the art, in accordance with the idea of the disclosure, specific implementations and application ranges may vary. In summary, the contents of the specification shall not be understood as a limitation of the disclosure.

What is claimed is:

1. A method for detecting an unlicensed frequency band, applied to a terminal, comprising:

determining whether a detection mechanism for a channel in an unlicensed frequency band needs to be adjusted based on a preset communication parameter;
in response to determination that the detection mechanism needs to be adjusted, determining an adjusted detection mechanism; and
detecting the channel in the unlicensed frequency band based on the adjusted detection mechanism;
wherein the preset communication parameter comprises a preset pilot sequence sent by a base station, and wherein determining whether the detection mechanism for the channel in the unlicensed frequency band needs to be adjusted based on the preset communication parameter comprises:
determining whether the preset pilot sequence is received;
wherein, in response to that the preset pilot sequence is received, determining that the detection mechanism needs to be adjusted.

2. The method of claim 1, wherein the preset communication parameter comprises a time interval between time information of a scheduling instruction sent by a base station and a time domain resource scheduled by the scheduling instruction;
and wherein determining whether the detection mechanism for the channel in the unlicensed frequency band needs to be adjusted based on the preset communication parameter comprises:
determining whether the time interval is greater than a preset duration;
wherein, in response to that the time interval is greater than the preset duration, determining that the detection mechanism needs to be adjusted.

3. The method of claim 2, wherein the preset communication parameter comprises a time interval between time information of a scheduling instruction sent by a base station and a time domain resource scheduled by the scheduling instruction, and a time domain resource of uplink transmission scheduled by the scheduling instruction sent by the base station;
and wherein determining whether the detection mechanism for the channel in the unlicensed frequency band needs to be adjusted based on the preset communication parameter, comprises:
determining whether the time interval is greater than a preset duration;
in response to that the time interval is greater than the preset duration, determining whether the time domain resource of uplink transmission is outside current channel occupancy time of the unlicensed frequency band;
wherein, in response to that the time domain resource of uplink transmission is outside the current channel occupancy time of the unlicensed frequency band, determining that the detection mechanism needs to be adjusted.

4. The method of claim 1, wherein the preset communication parameter comprises a time domain resource of uplink transmission scheduled by a scheduling instruction sent by a base station;
and wherein determining whether the detection mechanism for the channel in the unlicensed frequency band needs to be adjusted based on the preset communication parameter comprises:
determining whether the time domain resource of uplink transmission is outside current channel occupancy time of the unlicensed frequency band;
wherein, in response to that the time domain resource of uplink transmission is outside the current channel occupancy time of the unlicensed frequency band, determining that the detection mechanism needs to be adjusted.

5. The method of claim 1, wherein the preset communication parameter comprises indication information sent by a base station, and wherein determining whether the detection mechanism for the channel in the unlicensed frequency band needs to be adjusted based on the preset communication parameter, comprises:
determining whether the indication information is received;
wherein, in response to that the indication information is received, determining that the detection mechanism needs to be adjusted;
determining the adjusted detection mechanism, comprises:
determining the adjusted detection mechanism based on the indication information sent by the base station.

6. The method of claim 5, wherein the indication information is comprised in first downlink control information, wherein the first downlink control information is further configured to indicate information other than the indication information to the terminal.

7. The method of claim 5, wherein the indication information is comprised in second downlink control information, wherein, the second downlink control information is dedicated to indicating a detection mechanism to the terminal.

8. The method of claim 5, wherein the indication information is a scrambling sequence, wherein determining the adjusted detection mechanism based on the indication information sent by the base station, comprises:
determining a detection mechanism corresponding to the scrambling sequence as the adjusted detection mechanism based on the scrambling sequence and a prestored association relationship between scrambling sequences and detection mechanisms.

9. The method of claim 5, wherein the indication information is configured to indicate updating determined detection mechanism.

10. The method of claim 5, wherein the indication information is configured to indicate a detection mechanism.

11. The method of claim 1, wherein determining the adjusted detection mechanism, comprises:
determining a type of the adjusted detection mechanism, and a parameter of the adjusted detection mechanism.

12. An electronic device, comprising:
a processor; and
a memory configured to store instructions executable by the processor;
wherein, the processor is configured to implement:
determining whether a detection mechanism for a channel in an unlicensed frequency band needs to be adjusted based on a preset communication parameter;
in response to determination that the detection mechanism needs to be adjusted, determining an adjusted detection mechanism; and
detecting the channel in the unlicensed frequency band based on the adjusted detection mechanism;
wherein the preset communication parameter comprises a preset pilot sequence sent by a base station, and the processor is configured to implement:
determining whether the preset pilot sequence is received;
wherein, in response to that the preset pilot sequence is received, determining that the detection mechanism needs to be adjusted.

13. The electronic device of claim 12, wherein the preset communication parameter comprises a time interval between time information of a scheduling instruction sent by a base station and a time domain resource scheduled by the scheduling instruction;
- the processor is configured to implement:
- determining whether the time interval is greater than a preset duration;
- wherein, in response to that the time interval is greater than the preset duration, determining that the detection mechanism needs to be adjusted.

14. The electronic device of claim 13, wherein the preset communication parameter comprises a time interval between time information of a scheduling instruction sent by a base station and a time domain resource scheduled by the scheduling instruction, and a time domain resource of uplink transmission scheduled by the scheduling instruction sent by the base station;
- the processor is configured to implement:
- determining whether the time interval is greater than a preset duration;
- in response to that the time interval is greater than the preset duration, determining whether the time domain resource of uplink transmission is outside current channel occupancy time of the unlicensed frequency band;
- wherein, in response to that the time domain resource of uplink transmission is outside the current channel occupancy time of the unlicensed frequency band, determining that the detection mechanism needs to be adjusted.

15. The electronic device of claim 12, wherein the preset communication parameter comprises a time domain resource of uplink transmission scheduled by a scheduling instruction sent by a base station;
- the processor is configured to implement:
- determining whether the time domain resource of uplink transmission is outside current channel occupancy time of the unlicensed frequency band;
- wherein, in response to that the time domain resource of uplink transmission is outside the current channel occupancy time of the unlicensed frequency band, determining that the detection mechanism needs to be adjusted.

16. The electronic device of claim 12, wherein the preset communication parameter comprises indication information sent by a base station, and the processor is configured to implement:
- determining whether the indication information is received;
- wherein, in response to that the indication information is received, determining that the detection mechanism needs to be adjusted;
- determining the adjusted detection mechanism, comprises:
- determining the adjusted detection mechanism based on the indication information sent by the base station.

17. The electronic device of claim 16, wherein the indication information is comprised in first downlink control information, wherein, the first downlink control information is further configured to indicate information other than the indication information to the electronic device.

18. The electronic device of claim 16, wherein the indication information is comprised in second downlink control information, wherein, the second downlink control information is dedicated to indicating a detection mechanism to the electronic device.

19. The electronic device of claim 16, wherein the indication information is a scrambling sequence, wherein, the processor is configured to implement:
- determining a detection mechanism corresponding to the scrambling sequence as the adjusted detection mechanism based on the scrambling sequence and a prestored association relationship between scrambling sequences and detection mechanisms.

20. The electronic device of claim 16, wherein the indication information is configured to indicate updating determined detection mechanism.

21. The electronic device of claim 16, wherein the indication information is configured to indicate a detection mechanism.

22. The electronic device of claim 12, wherein the processor is configured to implement:
- determining a type of the adjusted detection mechanism, and a parameter of the adjusted detection mechanism.

* * * * *